UNITED STATES PATENT OFFICE.

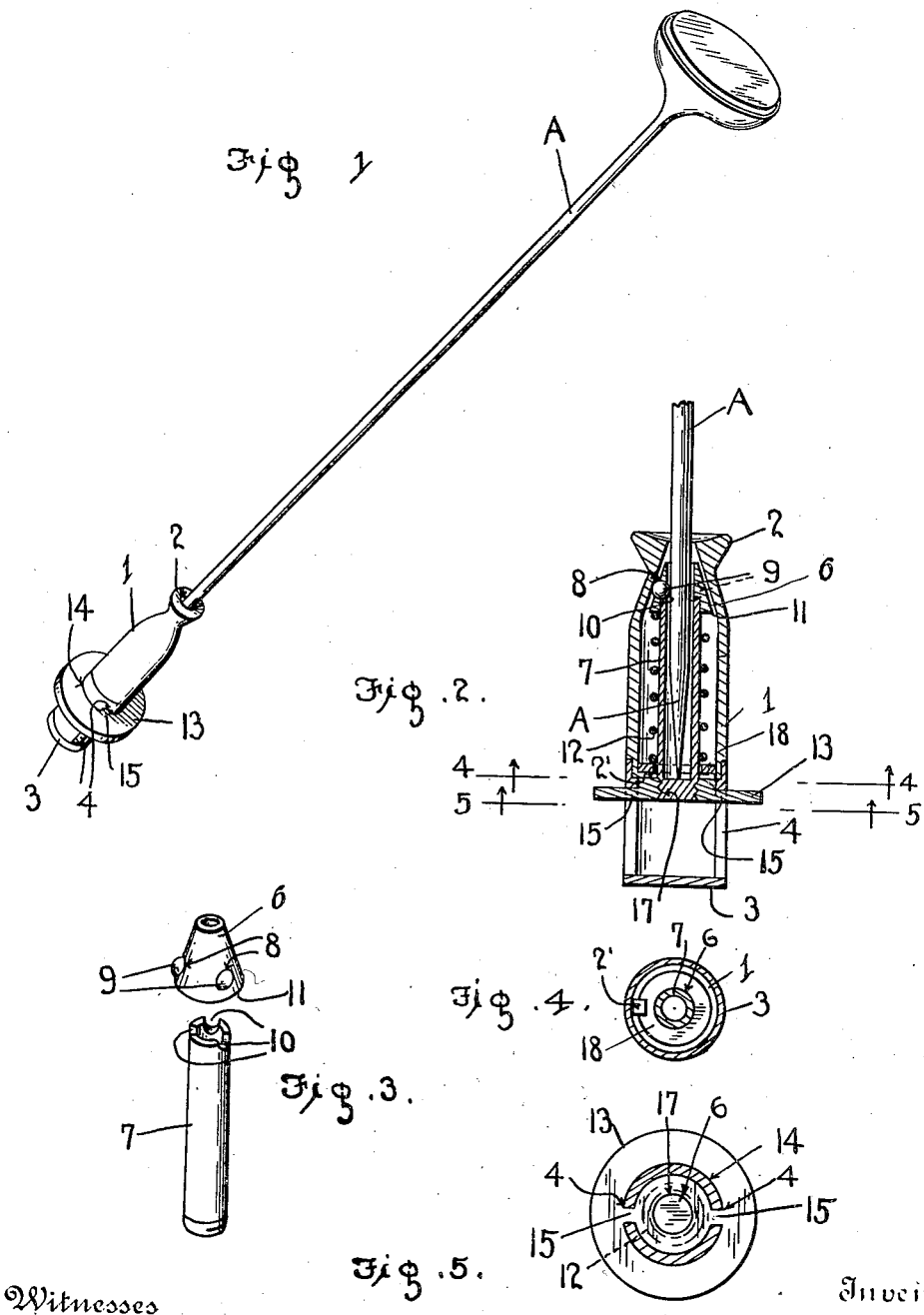

THEOPHILE SOKOLOWSKI AND WALTER BUSZEK, OF ST. LOUIS, MISSOURI.

HAT-PIN GUARD.

1,017,817.  Specification of Letters Patent.  Patented Feb. 20, 1912.

Application filed May 22, 1911. Serial No. 628,651.

*To all whom it may concern:*

Be it known that we, THEOPHILE SOKOLOWSKI, a subject of the Czar of Russia, and WALTER BUSZEK, a subject of the Emperor of Austria-Hungary, residing at St. Louis, in the State of Missouri, have invented certain new and useful Improvements in Hat-Pin Guards; and we do declare the following to be a full, clear, and exact description of the invention, such as will enable others skilled in the art to which it appertains to make and use the same.

This invention relates to improvements in hat pin guards.

The object of the invention is to provide a simple, efficient and ornamental guard for protecting the points of hat pins.

With this and other objects in view, the invention consists in the novel construction, arrangement and combination of the several parts as will be hereinafter fully set forth and claimed.

In the accompanying drawings:—Figure 1 represents a perspective view of a guard constructed in accordance with this invention in position upon a pin; Fig. 2 is a central longitudinal section thereof, on an enlarged scale; Fig. 3 is an enlarged detail perspective view of the pin receiving element with the parts thereof arranged in juxtaposition ready for assembling; Fig. 4 is a horizontal section on the line 4—4 of Fig. 2; Fig. 5 is a horizontal section taken on the line 5—5 of Fig. 2.

In the embodiment illustrated a clutch casing 1 is shown in the form of a tubular cylindrical member which tapers toward one end and terminates in a flared mouth 2 which receives the point of the pin A, the flaring of the mouth facilitating the insertion of the pin point. This member 1 has an inturned lug 2' at its larger end for a purpose to be described. A cap 3 fits over the large end of the casing 1 and is provided with diametrically arranged longitudinally extending slots 4 and 5 for a purpose to be described.

A hollow truncated cone-shaped clutch member 6 open at both ends is mounted on a tubular stem 7 and fits within the tapered end of the casing 1 and the side walls of said member 6 are provided with a plurality of apertures 8 which form seats for clutch balls 9 three being herein shown. These balls are held in their seats by engagement with the side walls of the casing 1 and the farther said clutch member is projected into the reduced end of the casing the farther the balls are forced into said clutch member and into close relation with each other and which thereby exert a tighter gripping action on the pin which is inserted between the balls. The tubular stem 7 preferably fits tightly in the large end of the clutch member 6 to provide for its disconnection therefrom if desired and the end inserted in said clutch member is provided with semicircular recesses 10 which register with the lower portions of the ball seats 8. A shoulder 11 is formed at the point of connection of the member 6 with the stem 7 and against which one end of a coiled spring 12 bears, said spring being wound on said stem, and bearing at its other end on an annular plate 18 which is limited in its outward movement by the lug 2' of the casing 1. The stem 7 extends through the flanged end of the casing 1 and is externally threaded at its outer end.

A plate 13 is slidably mounted on the cap 3 having segmental slots 14 therein connected at their ends by arms 15 which operate in the slots 4 and 5 of the cap 3 and form guides for said plates. The circular portion 16 of the plate within the slots 14 is arranged within the cap and has a centrally disposed screw-threaded socket 17 with which the outer threaded end of the stem 7 is detachably engaged. The spring 12 tends to hold the clutch member 6 projected into the tapered end of the casing 1 and when a pin is inserted between the balls 9 they are spread apart and the clutch member 6 forced back into the casing 1 against the tension of the spring 12 whereby the pin is firmly gripped and the guard thus securely held engaged therewith. It will, of course, be understood that the guard may be decorated in any suitable or desired manner.

To release the pin, the plate 13 is moved outwardly which withdraws the clutch member 6 from engagement with the walls of the tapered end of the casing 1 and permits the balls to move away from each other and disengage the pin. The spring 12 normally holds the cone-shaped member 6 projected to its extreme forward limit to cause the balls to contact with each other and the insertion of a pin forces it backward a sufficient distance to permit the balls to separate to receive the pin between them.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

We claim as our invention:—

A hat pin guard comprising a tubular cylindrical clutch casing open at both ends and having one end tapered, a cap detachably connected with the larger end of said casing and having diametrically disposed longitudinally extending slots, a disk having a centrally disposed threaded aperture and oppositely disposed segmental slots arranged concentric with said aperture and adapted to slide on said clutch casing, the ends of said segmental slots being spaced apart to form guiding elements between the slots at oppositely disposed points on the disk and for engagement with the slots in said cap, a tubular stem externally screw threaded at one end to engage the threaded central aperture of said disk, a hollow truncated cone shaped member having its base tightly fitted on the free end of said stem and normally movable with said stem, and yieldably held in the tapered end of said casing, clutch members carried by said cone shaped member, and means for pressing said cone-shaped member into said casing.

In testimony whereof we have hereunto set our hands in presence of two subscribing witnesses.

THEOPHILE SOKOLOWSKI.
WALTER BUSZEK.

Witnesses:
FRANK KRUPA,
S. CIBOROWSKI.